United States Patent
Rephlo

(10) Patent No.: US 10,210,578 B2
(45) Date of Patent: Feb. 19, 2019

(54) SYSTEM AND METHOD FOR PROVIDING AUTOMATED RECEIPT AND BILL COLLECTION, AGGREGATION, AND PROCESSING

(71) Applicant: Capital One Financial Corporation, McLean, VA (US)

(72) Inventor: Jeremy Rephlo, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 642 days.

(21) Appl. No.: 14/191,962

(22) Filed: Feb. 27, 2014

(65) Prior Publication Data

US 2014/0244453 A1 Aug. 28, 2014

Related U.S. Application Data

(60) Provisional application No. 61/769,839, filed on Feb. 27, 2013.

(51) Int. Cl.
| | | |
|---|---|---|
| G06Q 40/00 | (2012.01) | |
| G06Q 30/02 | (2012.01) | |
| G06Q 30/04 | (2012.01) | |
| G06Q 10/10 | (2012.01) | |
| G06Q 20/14 | (2012.01) | |
| G06Q 20/04 | (2012.01) | |
| G06Q 20/10 | (2012.01) | |
| G06Q 20/20 | (2012.01) | |

(52) U.S. Cl.
CPC ............. *G06Q 40/12* (2013.12); *G06Q 30/04* (2013.01); *G06Q 10/107* (2013.01); *G06Q 20/0453* (2013.01); *G06Q 20/102* (2013.01); *G06Q 20/14* (2013.01); *G06Q 20/209* (2013.01); *G06Q 30/0201* (2013.01)

(58) Field of Classification Search
None
See application file for complete search history.

(56) References Cited

U.S. PATENT DOCUMENTS

| 5,832,457 | A  * | 11/1998 | O'Brien et al. ............ 705/14.13 |
|---|---|---|---|
| 7,783,515 | B1 * | 8/2010 | Kumar et al. .................. 705/16 |
| 2002/0174185 | A1 * | 11/2002 | Rawat et al. .................. 709/206 |
| 2003/0130993 | A1 * | 7/2003 | Mendelevitch ... G06F 17/30707 |
| 2003/0191711 | A1 * | 10/2003 | Jamison ................. G06Q 20/04 705/40 |
| 2004/0117450 | A1 * | 6/2004 | Campbell ............. H04L 12/585 709/207 |
| 2005/0228774 | A1 * | 10/2005 | Ronnewinkel .... G06F 17/30707 |
| 2011/0320325 | A1 * | 12/2011 | Preston .................. G06Q 40/00 705/30 |

(Continued)

*Primary Examiner* — Allen C Chein
(74) *Attorney, Agent, or Firm* — Troutman Sanders LLP; Christopher J. Forstner; John A. Morrissett

(57) ABSTRACT

A system and method in accordance with example embodiments may include automated receipt and bill collection, aggregation, and processing. Additionally, a system and method in accordance with example embodiments may a customer opt-in, scan one or more electronic messages including receipts and bills, retrieve transaction information from one or more electronic messages, associate retrieved transaction data with existing database data, and utilize the associated data to provide contextual information to a user.

19 Claims, 4 Drawing Sheets

(56) References Cited

U.S. PATENT DOCUMENTS

| | | | |
|---|---|---|---|
| 2012/0078682 A1* | 3/2012 | Pinsley | G06Q 30/0201 705/7.29 |
| 2015/0032526 A1* | 1/2015 | Calman | G06Q 30/0631 705/14.25 |
| 2015/0088709 A1* | 3/2015 | Mekala | G06Q 30/04 705/34 |

* cited by examiner

SYSTEM AND METHOD FOR PROVIDING AUTOMATED RECEIPT AND BILL COLLECTION, AGGREGATION, AND PROCESSING

CROSS-REFERENCE TO RELATED APPLICATIONS

This application claims priority to U.S. Provisional Patent Application No. 61/769,839, filed on Feb. 27, 2013, the entire contents of which is incorporated herein by reference.

This application contains subject matter related to U.S. patent application Ser. No. 14/133,762, entitled "System and Method for Triggering Mobile Device Functionality Using a Payment Card, filed, Dec. 19, 2013, the entire contents of which is incorporated herein by reference.

FIELD OF THE DISCLOSURE

The present disclosure relates to systems and methods for providing automated electronic receipt, emailed receipt, bill, printed receipt, and/or e-receipt collection, aggregation, and processing.

BACKGROUND OF THE DISCLOSURE

Emailed receipts or "e-receipts" are sent by various, disparate merchants to a customer's email address. E-receipts contain product level information. But the same product and/or service level information is not provided to financial institutions during the transaction associated with the e-receipt.

These and other drawbacks exist.

SUMMARY OF THE DISCLOSURE

Various example embodiments include systems and methods that include automated receipt and bill collection, aggregation, and processing. Additionally, a system and method in accordance with example embodiments may a customer opt-in, scan one or more electronic messages including receipts and bills, retrieve transaction information from one or more electronic messages, associate retrieved transaction data with existing database data, and utilize the associated data to provide a message to a user.

An example system includes a database that stores customer information, the customer information including information about a customer email account, one or more computer processors that accesses the customer email account and retrieves transaction data from an electronic receipt included in an email in the customer email account, a collection module that collects the retrieved transaction data, and an association module that associates the retrieved transaction data with existing data in one or more electronic databases.

An example method includes electronically scanning email of a customer in an email system to identify one or more emails that an electronic receipt, electronically scanning the electronic receipts in the one or more emails for transaction data associated with each of the respective electronic receipts, using one or more computer processors to extract the transaction data from the one or more electronic receipts, and associating the extracted transaction data with data previously stored in one or more electronic databases.

A further example method includes scanning one or more electronic bills for bill data, using one or more computer processors to extract the bill data from the one or more electronic bills, and associating the extracted bill data with data previously stored in one or more electronic databases.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
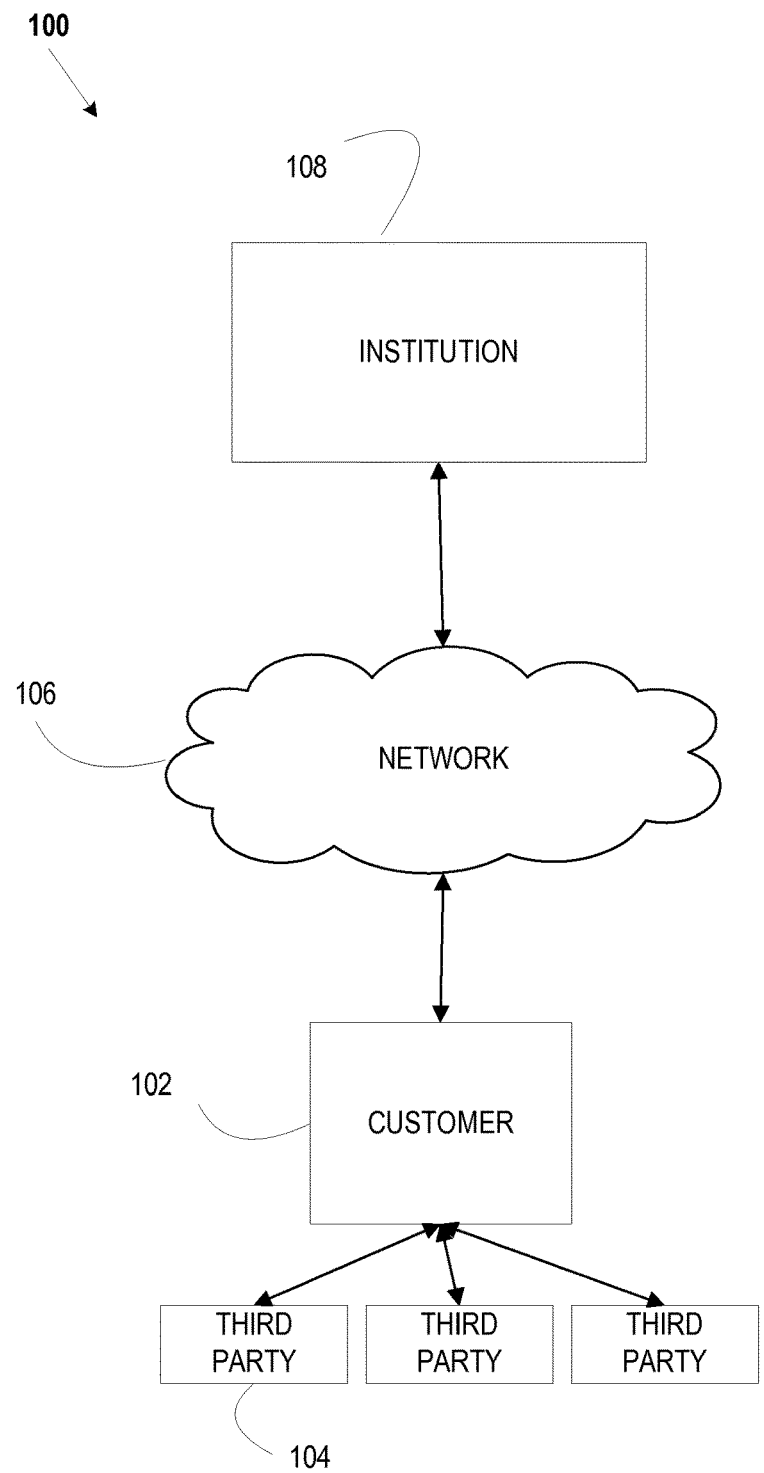
FIG. 1 depicts an example embodiment of a system implementing automated e-receipt collection, aggregation, and processing.

The following description is intended to convey a thorough understanding of the embodiments described by providing a number of specific example embodiments and details involving systems and methods for providing automated e-receipt collection, aggregation, and processing. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in various embodiments, depending on specific design and other needs. A financial institution and system supporting a financial institution are used as examples for the disclosure. The disclosure is not intended to be limited to financial institutions only. Further, it is envisioned that the embodiments disclosed herein function with receipts, bills, or any other type of financial documents. Receipts and bills are used below as example embodiments but the system may function with other relevant documents as well.

According to the various embodiments of the present disclosure, systems and methods enable automated e-receipt collection and processing. The term e-receipt as referred to herein may refer to any receipt that is in electronic form, including, without limitation, emailed receipts, photographed receipts, scanned receipts. Automated e-receipt collection, aggregation, and processing may be utilized to provide detailed account history and better marketing. The e-receipt collection and processing may be automated using various systems and networks as described herein.

In an example embodiment, a retailer or other party may e-mail or otherwise transfer an electronic receipt to a user. For example, during or after a purchase, a merchant may email a receipt or bill to an email address designated by the user. A user may allow a financial institution or other organization to scan an electronic mailbox, database, or other repository to find and process relevant receipts. The system may analyze receipts to extract relevant information. As an example and not by way of limitation, the system may analyze receipts to extract SKU (stock keeping unit) level purchase data. This SKU level purchase data may be useful to financial institutions or other organizations that may track purchase data of a user and present the data to the user in an appropriate context, such as in their statement. Additionally, a user may send a receipt or bill for processing to an email address monitored by the financial institution or other organization.

In an example embodiment, systems and methods may be utilized to process receipt information. For example and not by way of limitation, a processing system may take SKU level purchase data and/or data that describes a service and integrate the product and/or service data with known transaction data, such as a user's bill or statement. In addition to presenting the data to the user in their statement, the combined data may be used for analysis and other purposes, such as targeted offers or other marketing.

In an example embodiment, systems and methods may be utilized to permit a user to photograph a printed receipt or bill. The systems and methods may analyze the photograph to extract relevant information, which may be added to the system and made available to a user in similar ways as e-receipts or e-bills are utilized. Also, a user may send printed documents to a processing center for analysis and extraction of information. Additionally, a user may optionally forward the photograph to an e-mail address or other receiving system associated with a service provider, so as to allow individual document analysis without granting full access to a user's inbox.

In an example embodiment, the user may benefit greatly from automated e-receipt collection and processing. For example and not by way of limitation, the systems and methods may provide a mechanism for combined view of purchase history across multiple merchants. More detailed data may be available, and the user may be provided an option to "drill down" to the SKU level and the original receipt or bill. This may optionally be achieved without requiring manual entry of purchases or item information.

In an example embodiment, the combined view may be provided in the context of personal finance planning. For example and not by way of limitation, there may be provided a table of frequently purchased items, charts regarding money spent on each item or category of items, spending projections, related items, or any other relevant information. The combined view may also provide a mechanism to scan credit card purchases to detect fraud or errors.

In an example embodiment, the system may present offers, marketing, advertisements, coupons, and/or another item to a customer. For example and not by way of limitation, the system may present an advertisement to a similar or related product to one already purchased by a customer. Also, the system may allow a marketer or another party to present an offer, marketing materials, or other information to a customer targeted based on purchased products and/or services. An institution may utilize the information to deliver the advertisement, offer, coupon, or other message to the customer. The institution may customize the advertisement, offer, coupon, or other message according to the information. For example, and not by way of limitation, the institution may select, customize, or alter an advertisement, offer, coupon, or other message for relevance based on historical purchase patterns, or segmentation of existing repeat customers, or integrate the information with additional forms of data for greater granularity (e.g., geolocation, social graph). The offer, marketing materials, or other information according to the information may be actionable by a customer. For example and not by way of limitation, an institution may send a user a discount offer on a given product and/or from a given retailer. The user may then redeem the offer for the product and/or at the retailer. The institution may deliver the offer, marketing materials, or other information to the customer.

In an example embodiment, a cardholder may opt-in to automated scanning of their e-mail inbox to search for e-receipts. Once opted in, an institution may check each incoming and/or existing e-mail for receipt, purchase, and/or other financial information. Upon finding relevant information, an institution may match the receipt against a credit card transaction or other institutional information. The institution may parse the data to extract SKU or other product information to pair with the transaction. By doing this, the institution may make the paired data available to users and/or one or more third parties. The institution may also periodically scan the user's e-mail inbox for e-receipts. The institution may use various algorithms for identifying the e-receipts, such as, for example, scanning the subject of the email for keywords (e.g., "receipt", "e-receipt" or other like terms that may be used to identify e-receipts) and/or known merchant names. The institution may also full text search the emails and use various algorithms to score the emails and determine whether the email is an e-receipt.

Upon processing of the information, the institution may optionally display the information to a customer. For example and not by way of limitation, the institution may provide an electronic financial statement that shows financial, transactional, and credit information, but also displays, paired with that information, additional information regarding the items, goods, and/or services that were the subject of that transaction. Also, the system may display receipts or bills associated with transactions while the user is reviewing individual transaction records, preferably on a service provider's web site or other information providing system. Permitting the display of associated receipts or other documents may reduce transaction dispute frequency by providing additional information to a user.

In an example embodiment, the systems and methods provided herein may automatically process bills provided by a user. For example and not by way of limitation, the system may present an alert to a user when a bill is received prompting the user to pay the bill instantly or schedule a payment for that bill (e.g. "We've received a bill from UtilityCompanyInc. for $72.40. Pay now from Primary Checking (balance: $3212.45)?") Additionally, alerts may be triggered based on bill patterns or amounts. An algorithm may be used to analyze the billing patterns or amounts in order to determine spending behaviors or trends (e.g. "Your power bill is much higher this month than usual.") This data could be compared to aggregate data and presented to the user (e.g. "You spend much more on clothing than others in your area.")

FIG. 1 depicts an example system 100 for use with an e-receipt scanning system. System 100 may include one or more customers 102, one or more of a third party 104, a network 106, and an institution 108.

One or more customers 102 may be in communication with the system 100. The one or more customers 102 may be, for example and not by way of limitation, an individual or business with a credit card or banking account with a bank or other financial institution. A customer may use the credit card or banking account to consummate a number of transactions with others. For example and not by way of limitation, a customer may utilize a credit card, debit card or mobile payment device to purchase an item at a retailer.

A customer 104 may consummate a transaction with a third party 104. The third party 104 may be, for example and not by way of limitation, a purveyor of goods and services. The third party 104 may be a brick and mortar retail location, an individual performing services, an online retailer, a financial institution, or any other party. The third party 104 may send or provide receipts to a customer. For example and not by way of limitation, the third party 104 may receive payment or otherwise consummate a transaction with a customer 102. The third party 104 may send an e-receipt via e-mail, listing information about the transaction. For example and not by way of limitation, the information may include customer information, account information, transaction information, payment information, and/or information about the products, services, or other subject of the transaction (including but not limited to SKU, date, item descriptions, hourly rates, serial numbers, device identifiers, or any other relevant information).

Network 106 may enable communication between an institution 108 and one or more customers 102. For example, Network 106 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 106 may include, without limitation, telephone lines, fiber optics, IEEE Ethernet 902.3, a wide area network ("WAN"), a local area network ("LAN"), or a global network such as the Internet. Also network 106 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more embodiments, network 106 may comprise a plurality of interconnected networks, such as, for example, the Internet, a service provider's network, a cable television network, corporate networks, and home networks.

Institution 108 may provide accounts for one or more customers 102. In an example embodiment, the institution 108 may retrieve e-receipts from the electronic mail account of a customer 102 and extract data from the e-receipts. The institution 108 may store the extracted data in a customer information database, and may optionally associate the data with other portions of information, such as a line item on a statement for presentation to the customer 102. Data may be stored in a format such as, for example, a flat file, an indexed file, a hierarchical database, a post-relational database, a relational database, such as a database created and maintained with software from, for example Oracle® Corporation, Microsoft® Excel file, Microsoft® Access file, or any other storage mechanism.

Figure 2:
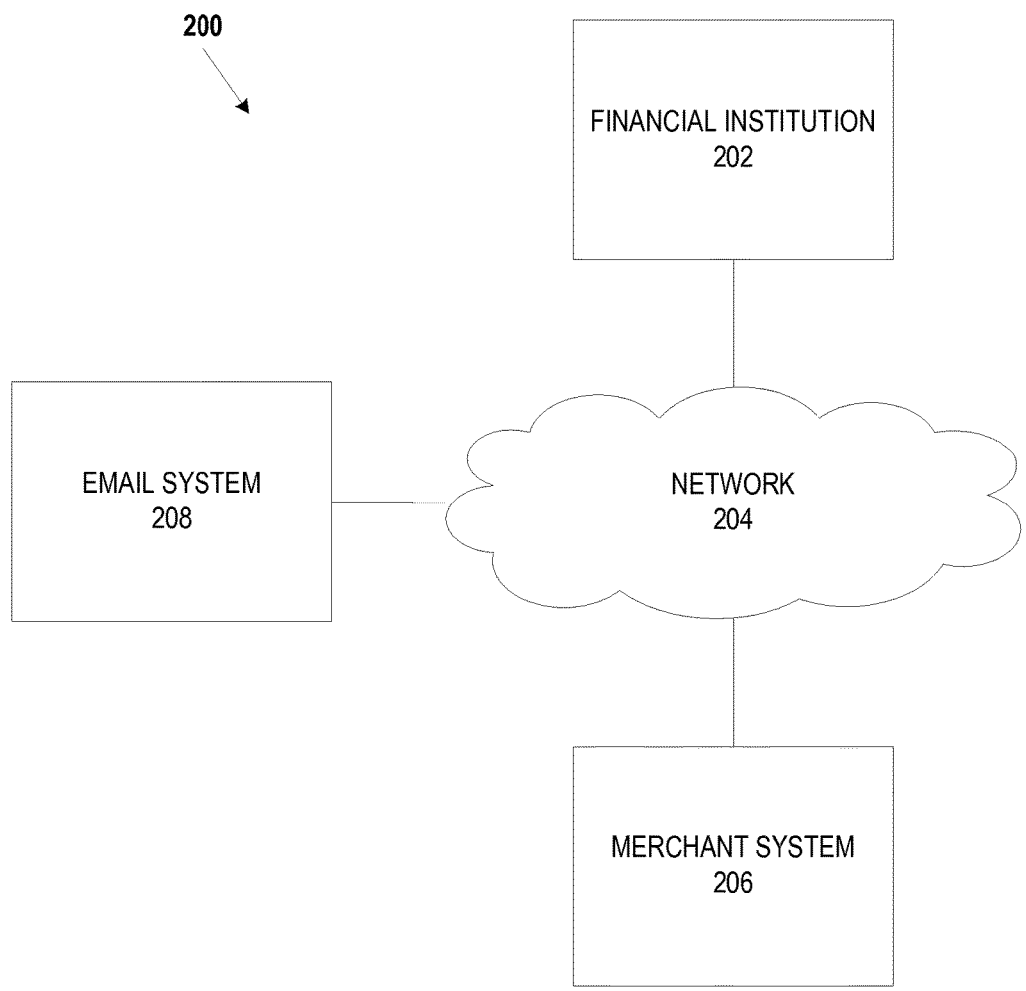
FIG. 2 depicts an example embodiment of a system implementing automated e-receipt collection, aggregation, and processing.

FIG. 2 depicts an example system 200 for providing automated e-receipt collection, aggregation, and processing. System 200 may include financial institution 202, network 204, merchant system 206, and email system 208. In various embodiments, financial institution 203 may be similar to institution 108 and/or system 300. Network 204 may be similar to network 106 and/or network 304.

In various embodiments, financial institution 202 also may include hardware and/or software that enables web scraping of, for example, email system 208. In various embodiments, financial institution 202 may include, for example, an application programming interface (API) that enables financial institution 202 to log in to, for example, email system 208 as a customer of email system 208 and simulate email browsing.

Merchant system 206 may include hardware and/or software that enables a merchant to prepare and transmit e-receipts. For example, merchant system 206 may include an email system similar to email system 208 that allows a merchant to transmit e-receipts to merchant customers using, for example, email system 208. Merchant system 206 also may include hardware and/or software to transmit e-receipts via other messaging methods, including, for example, SMS messaging, instant messaging, social network messaging, and the like.

Email system 208 may include hardware and/or software that enables, for example, web-based email and/or post office protocol 3 (POP3) email. Email system 208 also may include Internet Message Access Protocol (IMAP) servers and/or Message Application Programming Interface (MAPI) servers. Email system 208 may maintain email accounts for a plurality of account holders. An account holder may establish a username and password to enable the account holder to log in and access email messages. In various embodiments, email system 208 may allow account holders to receive emails containing attachments, including e-receipts, and/or emails containing e-receipt information. Email system 208 may be coupled to network 204 to allow access to email system 208 by, for example financial institution 202 and merchant 206.

Figure 3:
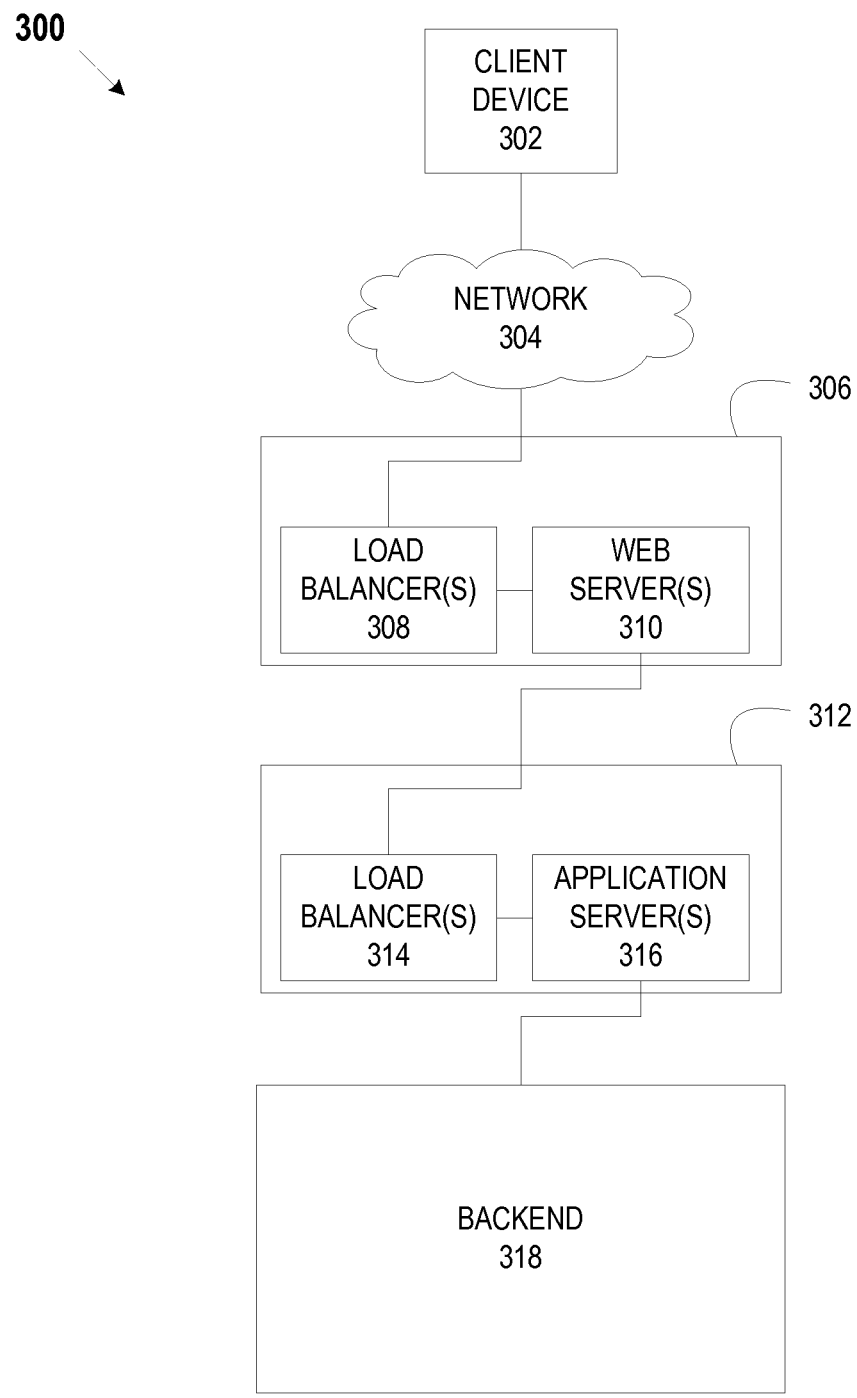
FIG. 3 depicts an example embodiment of a system implementing automated e-receipt collection, aggregation, and processing.

FIG. 3 depicts an example system 300 that may enable a financial institution, for example, to provide network services to its customers. Example system 300 also may enable a merchant to transmit e-receipts to customers. System 300 also may depict the architecture of an example email system. As shown in FIG. 3, system 300 may include a client device 302, a network 304, a front-end controlled domain 306, a back-end controlled domain 312, and a backend 318. Front-end controlled domain 306 may include one or more load balancers 308 and one or more web servers 310. Back-end controlled domain 312 may include one or more load balancers 314 and one or more application servers 316.

Client device 302 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 300 may execute one or more software applications to enable, for example, network communications.

Client device 302 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 304 may be one or more of a wireless network, a wired network, or any combination of a wireless network and a wired network. For example, network 304 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 304 may include, without limitation, telephone lines, fiber optics, IEEE Ethernet 902.3, a wide area network (WAN), a local area network (LAN) or a global network such as the Internet. Also, network 304 may support an Internet network, a wireless communication network, a cellular network, or the like, or any combination thereof. Network 304 may further include one network, or any number of example types of networks mentioned above, operating as a stand-alone network or in cooperation with each other. Network 304 may utilize one or more protocols of one or more network elements to which they are communicatively couples. Network 304 may translate to or from other protocols to one or more protocols of network devices. Although network 304 is depicted as a single network, it should be appreciated that according to one or more embodiments, network 304 may comprise a plurality of interconnected networks, such as, for example, the Internet, a service provider's network, a cable television network, corporate networks, and home networks.

Front-end controlled domain 306 may be implemented to provide security for backend 318. Load balancer(s) 308 may distribute workloads across multiple computing resources, such as, for example computers, a computer cluster, network links, central processing units or disk drives. In various embodiments, load balancer(s) 310 may distribute workloads across, for example, web server(S) 316 and/or backend 318 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 308 may include software that monitoring the port where external clients, such as, for example, client device 302, connect to access various services of a financial institution, for example. Load balancer(s) 308 may forward requests to one of the application servers 316 and/or backend 318 servers, which may then reply to load balancer 308. This may allow load balancer(s) 308 to reply to client device 302 without client device 302 ever knowing about the internal separation of functions. It also may prevent client devices from contacting backend servers directly, which may have security benefits by hiding the structure of the internal network and preventing attacks on backend 318 or unrelated services running on other ports, for example.

A variety of scheduling algorithms may be used by load balancer(s) 308 to determine which backend server to send a request to. Simple algorithms may include, for example, random choice or round robin. Load balancers 308 also may account for additional factors, such as a server's reported load, recent response times, up/down status (determined by a monitoring poll of some kind), number of active connections, geographic location, capabilities, or how much traffic it has recently been assigned.

Load balancers 308 may be implemented in hardware and/or software. Load balancer(s) 308 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 310 may include hardware (e.g., one or more computers) and/or software (e.g., one or more applications) that deliver web content that can be accessed by, for example a client device (e.g., client device A 02) through a network (e.g., network 304), such as the Internet. In various examples, web servers, may deliver web pages, relating to, for example, online banking applications and the like, to clients (e.g., client device 302). Web server(s) 310 may use, for example, a hypertext transfer protocol (HTTP or sHTTP) to communicate with client device 302. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 310 may respond with the content of that resource or an error message if unable to do so. The resource may be, for example a file on stored on backend 318. Web server(s) 310 also may enable or facilitate receiving content from client device 302 so client device AO2 may be able to, for example, submit web forms, including uploading of files.

Web server(s) also may support server-side scripting using, for example, Active Server Pages (ASP), PHP, or other scripting languages. Accordingly, the behavior of web server(s) 310 can be scripted in separate files, while the actual server software remains unchanged.

Load balancers 314 may be similar to load balancers 308 as described above.

Application server(s) 316 may include hardware and/or software that is dedicated to the efficient execution of procedures (e.g., programs, routines, scripts) for supporting its applied applications. Application server(s) 316 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 316 may act as a set of components accessible to, for example, a financial institution or other entity implementing system 300,through an API defined by the platform itself. For Web applications, these components may be performed in, for example, the same running environment as web server(s) 310, and application servers 316 may support the construction of dynamic pages. Application server(s) 316 also may implement services, such as, for example, clustering, fail-over, and load-balancing. In various embodiments, where application server(s) 316 are Java application servers, the web server(s) 316 may behaves like an extended virtual machine for running applications, transparently handling connections to databases associated with backend 318 on one side, and, connections to the Web client (e.g., client device 302) on the other.

Backend 318 may include hardware and/or software that enables the backend services of, for example, a financial institution or other entity that maintains a distributes system similar to system 300. For example, backend 318 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 318 may be associated with various databases, including account databases that maintain, for example, customer account information, product databases that maintain information about products and services available to customers, content databases that store content associated with, for example, a financial institution, and the like. Backend 318 also may include hardware and/or software that enable automated e-receipt collection, aggregation, and processing. Backend 318 also may be associated with one or more servers that enable the various services provided by merchant 206.

Figure 4:
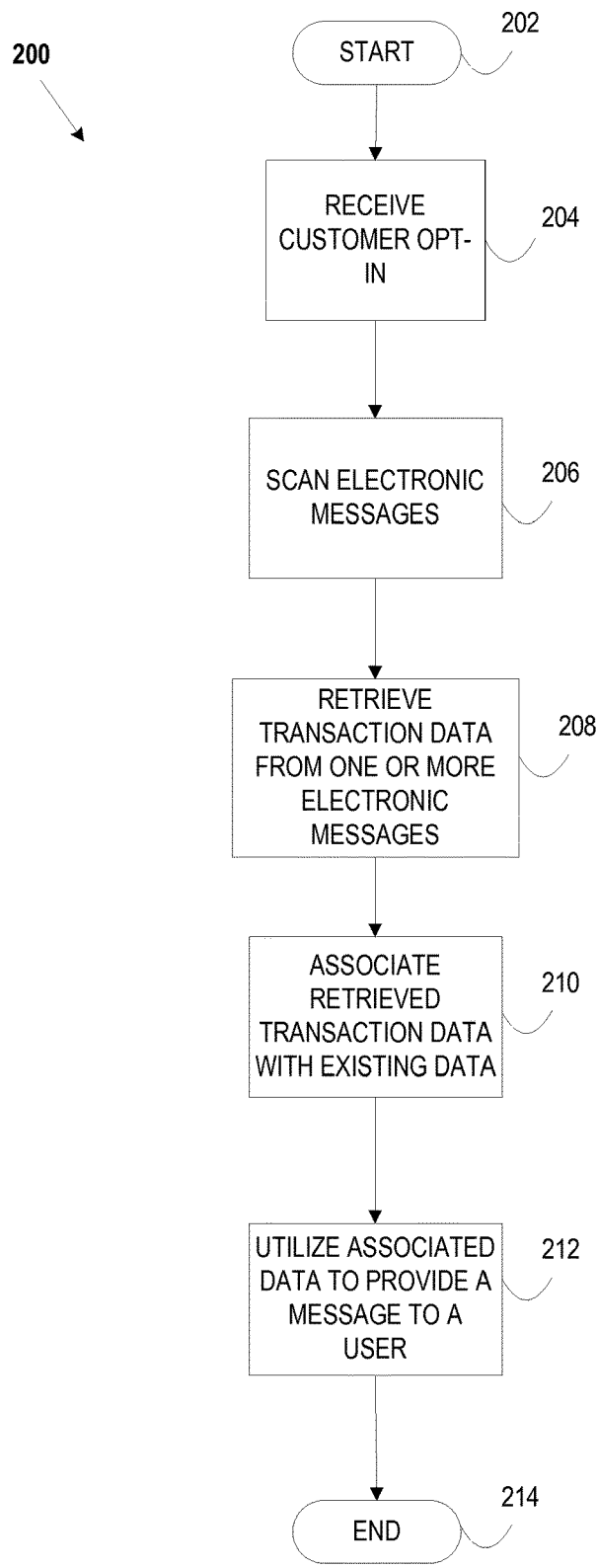
FIG. 4 depicts an example embodiment of a method utilizing automated e-receipt collection, aggregation, and processing.

FIG. 4 provides an example method 400 for utilizing automated e-receipt collection and processing. At step 402, the method may start. At step 404, an institution may receive a customer opt-in from a customer. The opt-in may include, for example and not by way of limitation, information permitting access to one or more electronic mail accounts, which may include log in information. The information permitting access may allow an institution to periodically log in to the customer's email system, for example, as the customer and scan the customer's email that is associated with the login information. The login information also may be used by an application programming interface (API) associated with the institution to have access to and scan the customer's email accounts as described herein. In various embodiments, the customer may opt-in via a setting set by the customer in a settings profile associated with the customer. For example, a customer could log in to an online banking application associated with the institution and set a setting in a setting profile associated with the customer. The settings profile also may allow the customer to provide the login information via, for example, the online banking application. Once the institution has received the opt-in, the institution may save a setting (e.g., a flag in an account associated with the customer) in an account database.

At step 406, an institution may scan electronic messages. In an example embodiment, the institution may, for example, log in as a customer to access customer email messages. To scan messages, in an example embodiment, the institution may step through each electronic mail message in a customer's inbox. Each message may be individually analyzed for information indicating an e-receipt. As noted above, the method may also be utilized for bill analysis and processing. The scanning procedure may include contextual analysis, keyword search, or any other viable process. For example, the institution may search for the term "receipt" in each message to identify electronic receipts. The scanning procedure also may include screen or web scraping of customer email. Also, the system may analyze portions of the message other than the body, such as the subject, sender, date/time information, etc. The institution may constantly and/or continuously monitor for new messages, scan at predetermined intervals, or scan as requested by a customer.

At step 408, the institution may retrieve transaction data from one or more electronic messages. In an example embodiment, the institution may extract transaction data from an e-mail that has been identified as a receipt, using, for example, techniques associated with web and/or screen scraping. For example, the institution may retrieve the retailer name, purchase price, and description of the item (including, but not limited to, name and/or SKU level data). The institution may store transaction data in, for example, databases associated with backend systems of the institution.

At step 410, an institution may associate the transaction data retrieved from the electronic messages with existing data in a database. In an example embodiment, the institution may maintain an electronic database containing data related to a customer, such as, address, social security number, income information, transaction information, demographic information, or any other information relevant to the system or method. For example, the institution may take the data retrieved from an electronic receipt and find the transaction entry that represents that purchase. The institution may associate the retrieved data with the transaction entry in one or more electronic databases. In various embodiments, the institution may attempt to match information relating to, for example, a purchase transaction with, for example information received from an e-receipt. For example, the institution may attempt to compare and match transaction amounts of purchase transactions with the transaction amount from an e-receipt.

At step 412, the institution may provide a message to a user. For, the message may be an offer, marketing communication, advertisement, coupon, and/or other message, and may optionally be a text, photo, or image section on an institution statement or web site. Also, the institution may record success rates of the messages. The institution may also collect analytics to store and/or provide to a third party. The analytics may include, for example, the success rates, the total advertisements presented, the timing and context of each of advertisement, and any other relevant information. For example, institution may monitor future transactions to determine whether an offer has been redeemed as is described in U.S. patent application Ser. No. 14/133,762, entitled "System and Method for Triggering Mobile Device Functionality Using a Payment Card, filed, Dec. 19, 2013, the entire contents of which is incorporated by reference. At step 414, the method may end.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A system comprising:

data storage storing existing transaction data and customer information, the customer information including log-in information about a customer email account associated with a customer; and memory storing instructions that, when executed by one or more processors associated with an application programming interface (API), cause the one or more processors to:

receive, by the one or more processors, a photographed transaction document, the photographed transaction document comprising a photograph of a printed receipt or a printed bill;

periodically and automatically, without involvement of the customer, log in to the customer email account using the stored log-in information;

electronically scan message data corresponding to one or more email messages in the customer email account to identify one or more email messages including one or more electronic transaction documents;

determine, by the one or more processors, whether the photographed transaction document and each of the detected electronic transaction documents is an electronic receipt by:

identifying transaction data included in the photographed transaction document or the detected electronic transaction document by electronically scanning, by the one or more processors, the photographed transaction document or the detected electronic transaction document of a corresponding email of the one or more emails;

for the photographed electronic transaction document, extracting, by the one or more processors, the transaction data from the photographed transaction document based on the identified transaction data;

for the detected electronic transaction document, extracting, by the one or more processors, the transaction data from the detected electronic transaction document based on the identified transaction data and a contextual analysis of the corresponding email message; and determining a score, by the one or more processors, to determine whether the photographed transaction document or the detected electronic transaction document comprises an electronic receipt;

responsive to determining that the photographed transaction document or the detected electronic transaction document comprises an electronic receipt, associate, by the one or more processors, the extracted transaction data with the stored existing transaction data;

generate, by the one or more processors, an output comprising (i) a financial planning tool associated with the extracted transaction data and the existing transaction data, (ii) an offer based on the extracted transaction data and the existing transaction data, and (iii) a purchase history associated with one or more merchants corresponding to one or more merchants identified from the extracted transaction data;

transmit, to the user device associated with the user, the output;

responsive to determining that the photographed transaction document or the detected electronic transaction document is not an electronic receipt, determine that the photographed transaction document or the detected electronic transaction document is a bill; and responsive to determining that the photographed transaction document or the detected electronic transaction document is a bill, execute one or more bill actions, the one or more bill actions comprising (i) transmitting an alert to a user device associated with the user, the alert indicating that the bill should be paid, and (ii) automatically scheduling payment of the electronic bill.

2. The system of claim 1, wherein the API comprises:

a web scraper configured to extract the transaction data from the one or more detected electronic transaction documents included in the one or more email messages.

3. The system of claim 1, wherein the API is configured to access the customer email account using the log-in information and to detect transaction data from an electronic transaction document included in the one or more email messages by simulating email browsing.

4. The system of claim 1, wherein the log-in information includes a username and password.

5. The system of claim 1, wherein the transaction data includes a transaction amount and wherein the existing transaction data includes purchase transactions.

6. The system of claim 5, wherein the instructions, when executed by the one or more processors, further cause the one or more processors to:

compare the transaction amount with stored transaction amounts associated with respective purchase transactions; and identify, based on the comparison of the transaction amount to the stored transaction amounts, a particular purchase transaction corresponding to the detected electronic transaction document.

7. The system of claim 1, wherein the financial planning tool comprises a table of frequently purchased items.

8. The system of claim 1, wherein the financial planning tool comprises spending projections.

9. The system of claim 1, wherein the offer comprises an advertisement for a product that is related to a previously purchased product.

10. The system of claim 1, wherein the offer comprises a coupon based on historical purchase patterns.

11. A method comprising:

connecting, by one or more processors, a financial institute system and an email system, the one or more processors associated with an application programming interface (API) configured to simulate email browsing on the email system by periodically and automatically logging in to a customer email account of the email system, the logging in comprising applying stored log-in information associated with a user of the customer email account;

storing, in a data storage, existing transaction data and customer information, the customer information including the stored log-in information;

receiving, at a receiving system associated with the one or more processors, a photographed transaction document comprising a photograph of a printed receipt or a printed bill;

detecting one or more electronic transaction documents, the detecting comprising periodically electronically scanning, by the one or more processors, email data of the email account to identify one or more emails including an electronic transaction document;

determining, by the one or more processors, whether the photographed transaction document and each of the detected electronic transaction documents is an electronic receipt by:
identifying transaction data included in the photographed transaction document or the detected electronic transaction document by electronically scanning, by the one or more processors, the photographed transaction document or the detected electronic transaction document of a corresponding email of the one or more emails;

responsive to determining that the photographed transaction document or the detected electronic transaction document comprises an electronic receipt, associating, by the one or more processors, the identified transaction data with the existing transaction data;

generating, by the one or more processors, an output comprising (i) a financial planning tool associated with the identified transaction data and the existing transaction data, (ii) an offer based on the identified transaction data and the existing transaction data, and (iii) a purchase history associated with one or more merchants corresponding to one or more merchants identified from the identified transaction data;

transmitting, to the user device associated with the user, the output;

responsive to determining that the photographed transaction document or the detected electronic transaction document is not an electronic receipt, determining that the photographed transaction document or the detected electronic transaction document is a bill; and responsive to determining that the photographed transaction document or the detected electronic transaction document is a bill, executing one or more bill actions, the one or more bill actions comprising (i) transmitting an alert to a user device associated with the user, the alert indicating that the bill should be paid, and (ii) automatically scheduling payment of the electronic bill.

12. The method of claim 11, wherein the API enables web scraping the email system to retrieve the transaction data from the one or more detected electronic transaction documents.

13. The method of claim 11, wherein the stored log-in information includes a username and password.

14. The method of claim 11, wherein the transaction data includes a transaction amount and wherein the existing data includes purchase transactions.

15. The method of claim 14, further comprising:
comparing the transaction amount with transaction amounts associated with respective purchase transactions to determine which purchase transaction relates to a corresponding electronic receipt.

16. The method of claim 11 wherein the financial planning tool comprises a table of frequently purchased items.

17. The method of claim 11, wherein the financial planning tool comprises spending projections.

18. The method of claim 11, wherein the offer comprises an advertisement for a related product to one already purchased.

19. The method of claim 11, wherein the offer comprises a coupon based on historical purchase patterns.

\* \* \* \* \*